(12) United States Patent
Schilles (10) Patent No.: US 7,943,074 B2
(45) Date of Patent: May 17, 2011

(54) METHOD AND TOOL FOR PRODUCING A PLASTIC COMPONENT WITH A DECORATIVE LAYER, A BACKING LAYER AND AN ADDITIONAL MOLDED PART ATTACHED THERETO

(75) Inventor: Wilfried Schilles, Sontra (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 157 days.

(21) Appl. No.: 11/994,235

(22) PCT Filed: Jun. 28, 2005

(86) PCT No.: PCT/EP2005/006915
§ 371 (c)(1),
(2), (4) Date: Dec. 28, 2007

(87) PCT Pub. No.: WO2007/000174
PCT Pub. Date: Jun. 4, 2007

(65) Prior Publication Data
US 2008/0211137 A1      Sep. 4, 2008

(51) Int. Cl.
*B29C 45/56*      (2006.01)
(52) U.S. Cl. .................. 264/257; 425/457
(58) Field of Classification Search .............. 264/257; 425/457
See application file for complete search history.

(56) References Cited

U.S. PATENT DOCUMENTS

| | | | |
|---|---|---|---|
| 5,506,029 A * | 4/1996 | Hara et al. | 428/120 |
| 6,331,263 B1 * | 12/2001 | Abe et al. | 264/40.5 |
| 7,235,206 B2 * | 6/2007 | Kobayashi et al. | 264/259 |
| 2003/0194542 A1 | 10/2003 | Springer | |
| 2005/0227043 A1 * | 10/2005 | Schoemann et al. | 428/137 |
| 2006/0220274 A1 * | 10/2006 | Dooley et al. | 264/259 |

FOREIGN PATENT DOCUMENTS

| | | |
|---|---|---|
| DE | 101 24 122 C1 | 5/2002 |
| EP | 0 730 947 A2 | 9/1996 |
| JP | 2004-262119 A | 9/2004 |
| WO | WO 2004/099480 A2 | 11/2004 |

OTHER PUBLICATIONS

Electronic translation of DE 10124122 by European Paten Office, three pages.*
International Search Report dated May 19, 2006 with English translation (ten (10) pages).

* cited by examiner

*Primary Examiner* — Jill L Heitbrink
(74) *Attorney, Agent, or Firm* — Crowell & Moring LLP (57) ABSTRACT

A method for producing a component (3) comprising a backing layer, a decorative layer and an additional molded part (1) attached to the component. The method includes the following steps: A plasticized mat comprising fiber fractions, which is a starting material for the backing layer (12), is introduced together with a blank, which is a starting material for the decorative layer (14), into a compression molding tool (20) composed of a first tool half (21) including a low pressure injection unit (10) for producing the additional molded part and a second tool half (22). The tool halves (21, 22) are pressed together to join the starting materials; a predetermined quantity of plastic in a fluid state is simultaneously or subsequently introduced into the cavity (23) of the compression molding tool through a supply conduit (25), and a slider (24) is thereafter extended to an end position inside the cavity (23). After cooling of the plastic, the slider is retracted to its starting position, and the tool halves are separated. The invention also includes an apparatus for carrying out the method.

16 Claims, 6 Drawing Sheets

METHOD AND TOOL FOR PRODUCING A PLASTIC COMPONENT WITH A DECORATIVE LAYER, A BACKING LAYER AND AN ADDITIONAL MOLDED PART ATTACHED THERETO

BACKGROUND OF THE INVENTION

The invention relates to a method and a tool for producing a plastic component comprising a decorative layer and a backing layer and an additional molded part.

The component to be produced is, in particular, a plastic component comprising fiber fractions.

The additional molded part is attached to the rest of the component that is produced; and it is defined below, in particular, as an attachment, a retainer element, a receiving element, a reinforcing element or a rib or also, in general, as an additional component, which is to be integrated on the back side of the component.

In the prior art production of plastic components comprising a plurality of layers and additional molded parts, which are attached to said plastic components, the first step is to produce the component, comprising a backing layer and a decorative layer, with a compression molding tool in a laminating and contour-shaping process. In a second step the additional molded part is attached by injection molding or adhesive bonding or welding to the component. Such production processes need to be improved.

In contrast, plastic components, comprising a backing layer and a decorative layer, can also be produced by an injection molded backing process. In this case a decorative material is placed into an injection molding tool, and a thermoplastic material is injected behind the decorative material. This thermoplastic material solidifies upon cooling. In the production of molded parts using an injection casting tool, the molded parts can be produced in a single step or in multiple steps.

For example, EP 0 371 425 B1 discloses a two-step method. According to this method, a film material, which is provided as a decorative layer, is thermoformed and deep-drawn; and in a subsequent process step it is placed into an injection casting tool and is provided with an injection molded backing of a thermoplastic. However, this method is suitable only for simply shaped molded parts.

Furthermore, EP 0 320 925 A1 discloses a method, in which the decorative material is placed into the injection casting tool. Then a thermoplastic is injected behind the decorative material at 10 to 130 bar. Thus, the decorative material is then molded by the pressure of the thermoplastic material and is pressed into the injection casting mold. Even with this method only relatively simply shaped molded parts can be produced.

According to DE 197 29 780 C1, sliders were also used for producing moldings having complicated shapes. The movement of these sliders ensures that the injection casting material is pressed into all regions of the injection casting mold. However, this measure has proved to be very disadvantageous because it leads to wrinkling and damage to the decorative surface. Furthermore, the decorative layer is pressed so flat that a decorative embossing is no longer possible.

The slider is moved on the rear-sided tool half to that point of the backing element, at which the attachment is supposed to be produced. This position is simultaneously the contour-shaping position of the attachment. Then polypropylene is injected into the tool region from an injection point at an injection pressure ranging usually from 150 to 350 bar. The use of such a high pressure is necessary, inter alia, because the thin material gap in the tool for contour-shaping the attachment has to be filled entirely with the polypropylene. Therefore, a slider is moved first into position; and then the tool gap or the injection gap is filled with polypropylene. One drawback with this method is that the wall thickness of the attachment is relatively low at the transition region to the backing element so that, as a result the bonding area at this point is negligible.

The injection takes place just after the tool is closed, so that the fiber mat has not cooled down yet. That is, the material is still plasticized and, thus, soft. Furthermore, at a high injection pressure marks form on that side of the backing element and/or the fiber mat that is opposite the side of the attachment owing to the softness of the component. This side is usually covered with decorative material so that these marks constitute a drawback for the aesthetic appearance.

In order to avoid these problems, DE 197 29 780 C1 proposes a solution for manufacturing complicated molded parts, wherein the decorative material is placed in an injection molding tool, which is pressurized with gas while the tool is closed so that the decorative material is pressed into the cavities of the injection molding tool, and then the plastic is injected behind the decorative material. Owing to the uniform pressure distribution in the tool, a homogeneous pressing of decorative material into the cavities of the injection mold is achieved.

SUMMARY OF THE INVENTION

The object of the invention is to provide a method for producing a plastic component, comprising a decorative layer and a backing layer and an additional molded part, as well as a tool for producing such a component, which exhibits a relatively complicated shape and makes it possible to produce a stable attachment.

This object is achieved with the invention as described and claimed hereinafter.

The invention proposes a method for producing a component, comprising a backing layer and a decorative layer and an additional plastic molded part that is attached to the layers of said component. The method comprises the following steps:
  placing a plasticized mat, comprising fiber fractions, as the starting material of the backing layer and a blank as the starting material for the decorative layer into a compression molding tool comprising a first tool half with a contour-shaping engagement surface for engagement with the starting material for the backing layer and comprising a second tool half with a contour-shaping engagement surface for engagement with the starting material for the decorative layer. The first tool half exhibits at least one cavity and a slider, which can be slid in said cavity by means of an adjustment device, and a feed channel, which is connected to a means for feeding plastic, and said slider is in a retracted position,
  compressing the tool halves in order to connect together the starting materials, and simultaneously or subsequently admitting a predetermined amount of plastic in the plastic state through a feed channel into the cavity; the volume of the plastic, fed into the cavity, being less than the volume of the cavity,
  moving the slider into its end position, in which the plastic fills the gap, formed by the cavity and the slider in its end position,
  after the plastic in the cavity has cooled down, returning the slider into its initial position and separating the tool halves, so that the component can be removed from the compression molding tool.

According to the production method, in particular the plastic that penetrates into the cavity exhibits a pressure below 10 bar in the region of the cavity. In a preferred embodiment the volume of the plastic that is fed into the cavity can be 70% of the volume of the cavity. It can also be provided that the plastic is fed into the cavity at a temperature of 200 deg. Celsius +/−deg. Celsius.

Furthermore, the inventive production method may also provide that while the slider moves into its end position, the component material has a temperature in a range between 100 and 170 degrees Celsius.

According to the production method, the plastic that is to be admitted into the cavity can be a polypropylene. Furthermore, the backing layer in its initial state may be made of polypropylene, flax or kenaf, sisal, linen or cotton or glass fibers. In a further development of the invention, an additional layer for forming a decorative layer can be applied on the backing layer before the plastic is admitted.

According to the production method, the additional molded part can be at least an attachment or a structural element that projects from the backing layer or a rod-shaped structure. Moreover, the additional molded part can be a holder for receiving components or other parts. Furthermore, the additional molded part can be a connecting element or a rib or a spacing element or a design element for improving the strength of the component.

The invention also proposes a device for producing a component comprising a backing layer and at least one additional molded part. The device has a compression molding tool comprising at least one device for producing the additional molded part. The device for producing the additional molded part is an injection molding device, which has a cavity and a slider, which can be slid into the cavity between an initial position and an end position by an adjustment device, so that the molded part can be formed in a gap between a front surface of the slider (with respect to the intended direction of movement) and the cavity wall facing the front surface of the slider in the end position of the slider. Corresponding slider areas of the slider are the displacement areas in relation to the wall areas of the cavity, by which material, fed into the cavity, can be molded in the plastic state inside the changing intervening space when the slider moves.

In the case of the device, in particular the slider can be designed in such a manner that on its bottom slider area, facing the backing layer of the component, a spacing, which extends at least from one of the displacement areas, ensues between the bottom slider area and the surface of the backing layer, facing said bottom slider area, so that in the region of the transition point of the attachment a connecting element can be constructed on the component.

The cavity and the slider can be constructed in such a manner that the attachment is at least one structural element, which projects from the component, or a rod-shaped structure. Moreover, the cavity and the slider can be constructed in such a manner that the attachment is a holder for receiving components or other parts or also so that the attachment is a connecting element or a rib or a design element for improving the strength of the component.

One advantage of the inventive solution is that the low injection pressure, which suffices in the inventive method to create attachments, yields large bonding areas or reinforcing elements between the attachment and the backing element. Consequently it is possible to transfer larger forces from the attachment to the backing element. In addition, a deformation of the backing element (that is, markings or curvature) is ruled out, so that the result is a negligible pressure load on the decorative material.

Since the inventive production of the attachment on the inside of a component takes place when the plastic, e.g. the polypropylene, is injected into the appropriate cavity at low pressure, there is no risk that markings will form on the outside of the component. Therefore, this feature is especially advantageous, because this side of the component is usually its exposed side. Thus, it is possible to achieve with high reliability a smooth surface on the outside or the exposed side.

According to the inventive production method, no markings form on the opposite side or the exposed side of the base element.

BRIEF DESCRIPTION OF THE DRAWINGS

The inventions are described below with reference to the attached figures.

DETAILED DESCRIPTION OF ILLUSTRATIVE EMBODIMENTS

According to the inventive method, a compression molding process is carried out by a compression molding tool in order to form a combination comprising a backing layer and a decorative layer. The compression molding process is combined with a low pressure injection process in which plastic is fed at a relatively low pressure into a cavity with a slider element, which moves in said cavity in order to form the additional molded part without having to fill this cavity in its entirety. The contour-shaping step takes place with a suitable movement of the slider. Correspondingly, the inventive device for producing a plastic component comprising a decorative layer and a backing layer and an additional molded part relates to a compression molding tool which additionally comprises a cavity with a slider element.

Therefore, the component is made of a material for a decorative layer 14 in the form of a blank made of a suitable starting material, and a material for a backing layer 12 in the form of a plasticized mat. These mats are placed in the compression tool. In so doing, the first and the second layer or rather the mats are molded; and the two layers or rather mats are connected by closing a first tool member 21, facing the first layer 12, and a second tool member 22, facing the second layer 14. The blank and the mat are connected at a contact pressure inside the compression tool ranging from 0.5 to 5 bar.

The inventive device comprises a compression molding tool 20, which determines the contour of the component to be produced. The compression molding tool comprises at least a first tool member 21, which faces the first or backing layer 12, or a first tool half having a first three dimensional molding contour or contour-shaping engagement surface 21a and a second tool member 22, which faces the second or decorative layer 14, or a second tool half having a second three dimensional molding contour or contour-shaping engagement surface 22a. The tool members 21, 22 are moved in relation to each other in order to bring about the molding of the first layer 12 or rather the backing layer and the second layer 14 or rather the decorative layer and the connection of the two layers 12, 14 by closing the first and the second tool member 12 and/or 14. The first tool member 21 can be attached to a first tool holder or a mounting plate; and the second tool member 22 can be attached to a second tool holder or a mounting plate.

The first layer and the second layer are layers, which can be connected together under pressure and can be melted or interlocked, for example, at least in certain places. Generally both layers or rather mats may be multi-layered. Even a plurality of layers of the first layer or the second layer can be molded and connected together with the method and/or device of the invention.

In producing the component comprising a backing layer and a decorative layer, it must be possible to connect together the sides of the decorative layer and the backing layer that face each other by means of the pressure exerted by the tool, and, if desired, with the application of heat. To this end, the layer of the decorative layer that faces the backing layer may exhibit, in particular, the property of mechanically connecting to the backing layer under pressure—for example, by mechanical interlocking of threads or hairs, which are attached on the said side of the decorative layer, with the optionally melted-on surface of the backing layer. To this end, at least the surface of the decorative layer that faces the backing layer may be made of a woven fabric, which may be, for example, a non-woven fabric, a felt, a flat-woven material, a circular knit. The decorative layer and the backing layer may also be connected by melting the surfaces that face each other by applying pressure by means of the tool and optionally by the application of heat. Melting is achieved when the decorative layer contains foam constituents, which belong to the same material family as the backing layer that is provided for melting.

A textile woven fabric, a foam artificial leather, a plastic film or a leather may be used as the starting material for the decorative layer. When a textile woven fabric is used for forming the decorative layer, textile materials or films or a combination of both or a combination of said alternatives may be used as the starting material. In the case of the component to be produced, the decorative layer may be provided for the purpose of optimizing the haptic properties of the end product of the corresponding side of the component. Hence, the decorative layer may also comprise foam constituents. For example, the decorative layer may be a composite, comprising textile materials, a foam and a non-woven material. A polypropylene foam or polyethylene foam or a polyurethane-based foam may be used as the foam.

The starting material for the backing layer may comprise, in particular, plastic fractions and especially a polypropylene (PP)-fixed fiber mat. It can be plasticized, in particular, by the application of heat. The backing layer is made, preferably of a fibrous material, preferably natural fibers or glass fibers as well as made of plastic fibers and, in particular, polypropylene (PP) fibers. The natural fibers may be made of flax or kenaf, sisal, linen or cotton. The backing layer may also be a multi-layered structure, such as a backing layer and a reinforcing layer, such as a layer of glass fiber woven fabric.

This fiber material for forming the backing layer is molded into a mat in a preparatory step or in a step that precedes the method. Then by applying pressure and temperature with simultaneous melting of the plastic fraction, a material comprising plastic mats, which are connected together, is formed as a backing layer. In the compression molding tool, the mats are connected together with the plasticized decorative layer to form the component.

The invention relates, in general, to the production of an additional molded part on a backing layer, comprising a combination of backing layer and a decorative layer of the component, during the production of a structural component made of plastic and, in particular, polypropylene.

The additional molded part or attachment can serve, in general, as a holder for receiving components or other parts or for the attachment of the component, on which the attachment is provided. The attachment may also be a retainer element, a connecting element or a rib or a spacing element or a design element, for example, for improving the strength of the component. A retainer element usually serves to receive a connecting or fastening element, like a clip element, by which an additional structural component can be fastened or clipped to the aforementioned structural component. The production of a retainer element on a backing layer made of polypropylene is described below as an example for the production of the additional molded part.

Figure 1:
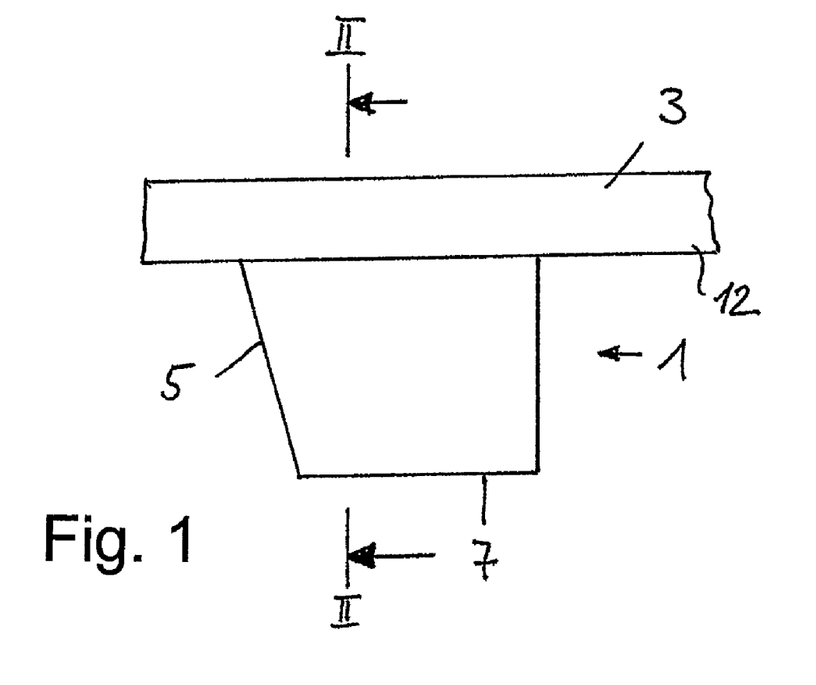
FIG. 1 is a schematic side view of an embodiment of the additional molded part, which can be produced with the inventive production method, and a detail of the component to which the molded part is attached.
Figure 2:
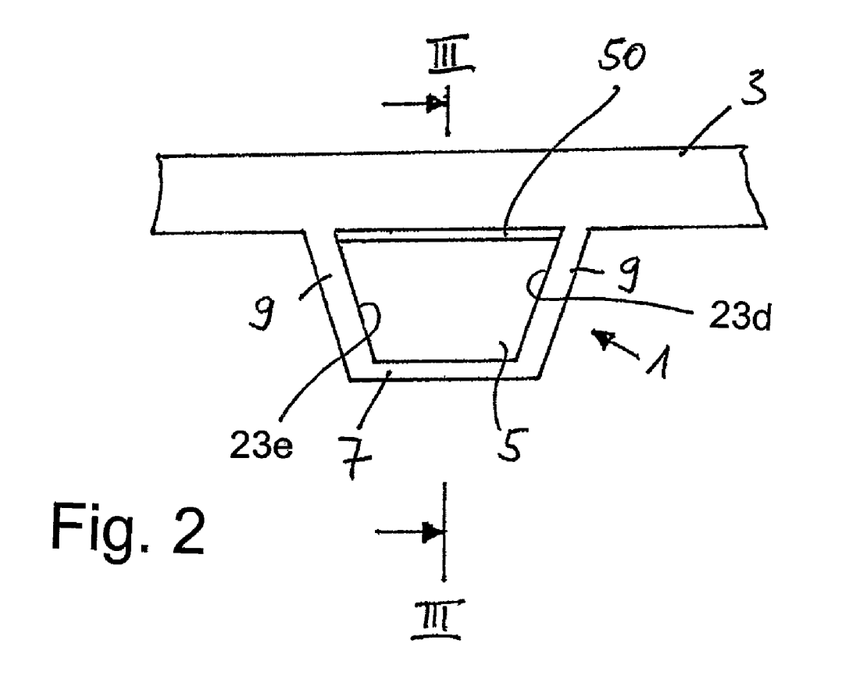
FIG. 2 is a side view of a detail of the component with the additional molded part of FIG. 1 along the line II-II in FIG. 1.
Figure 3:
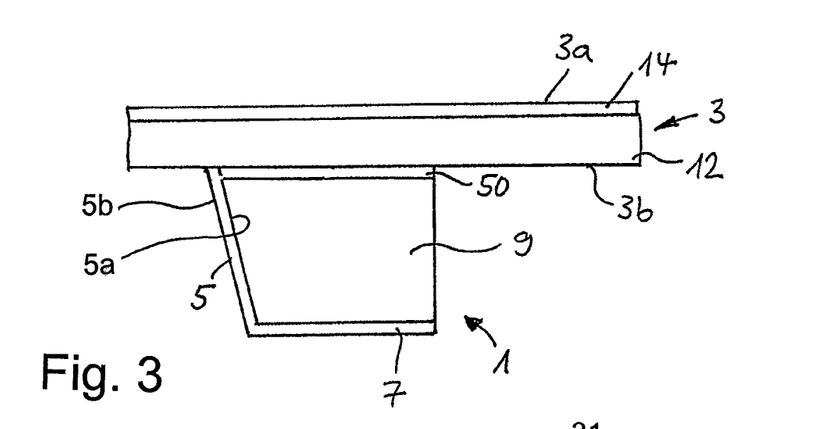
FIG. 3 is a sectional view of a detail of the component with the additional molded part, according to FIGS. 1 and 2.

FIGS. 1 and 2 are sectional schematic drawings, depicting the molded part 1, which is disposed additionally on the backing layer and which is to be produced in the example described below, in the form of a retainer element. The retainer element 1 is a part of a component to be produced and extends as a holder or protrusion or bracket from the backing layer 12 of said component. FIG. 1 is a sectional view of the molded part, which is shown as a retainer element. In the illustrated embodiment, the retainer element 1 forms a tab 5 with a first side 5a and a second side 5b (FIG. 3) and a hood or a roof 7 and is, thus, formed in the shape of a box. Furthermore, the illustrated embodiment of the attachment 1 or the retainer element comprises at least one side wall 9. In general, the attachment to be produced may also comprise fewer or more parts than are shown in FIGS. 1 and 2. The attachment 1 is made of at least one element, which is a structural element, which projects from the backing layer 12, and can be an elongated, rod-shaped structure or a wall element. In the case of the retainer element illustrated in FIGS. 1 and 2, it is realized as a tab or a side member 5.

In the inventive production method the component 3 is made up of at least a first layer or backing layer 12 and at least one additional layer or decorative layer 14. For the rest of the description the side on which the additional molded part or attachment 1 is placed is referred to as the first side or the inside 3b of the component 3, whereas the side that is disposed opposite the inside 3b or rather opposite from the attachment 1 is referred to below as the second side or the outside 3a. In the illustrated embodiment the first layer 12 is a backing layer and is placed on that side or inside 3b of the component 3, on which the attachment is laid for molding the attachment, so that the free surface of the inside forms the surface of the backing layer 12.

In a preparatory process step the decorative layer is brought into a thermoformable state.

Similarly in a preparatory process step the mat is plasticized by the action of temperature in order to form the backing layer.

Then, with the application of pressure while simultaneously melting the plastic fraction due to compression molding, a material comprising plastic mats, which are connected together, is formed. At the same time the tool halves are usually thermally regulated. The material comprising plastic mats and the layer for the decorative material are introduced into the compression molding tool 20 comprising a first and a second tool half 21 or 22, each of which exhibits a contour-shaping engagement surface 21a or 22a, and are thermoformed three-dimensionally by closing the tool members in the compression molding tool. Owing to the application of a suitable pressure, the at least two layers 12, 14 are connected together in the compression molding tool 20 and—for the purpose of forming the component 3 with the at least two layers 12, 14—compressed to its subsequent shape and to its wall thickness—that is, molded into the subsequent end contour. As a result, the layers are connected for the purpose of forming the component comprising the backing layer 12 and the decorative layer 14 and, if desired, additional intermediate layers (not shown).

Thus, due to the compression and thermoforming operation, the sides which face each other and belong to the tool halves 21 or 22 or belong to the top member 22 and the bottom member 21 of the tool 20 form the mold of the component to be produced. From a functional perspective, the tool 20 is a compression and thermoforming station, which preferably comprises a heat control unit in the top member 22 and the bottom member 21 of the tool 20 in order to maintain the mats in the thermoformable state. The tool itself is thermally regulated between 20 and 60 deg. C. Therefore, the backing layer 12 in the form of a mat is heated preferably in a separate station prior to placing the mat into the tool 20.

Before the compression operation the starting materials of the backing layer 12 can be placed in the bottom member 21; and the other layer 14 can be placed in the top member 22 of the tool, before they are compressed. As an alternative, the layers 12, 14 can also be placed together into one of the tool halves 21 or 22. By suitably closing the bottom member 21 and the top member 22 and by applying a suitable temperature and a suitable pressure, the starting materials of the component 3 are brought to the tool contour and, thus, brought by the contour-shaping engagement surfaces 21a, 22a into the desired component geometry. If a plurality of layers—hence, in the example a backing layer and an additional layer—are used, they are brought into connection with each other.

Figure 4:
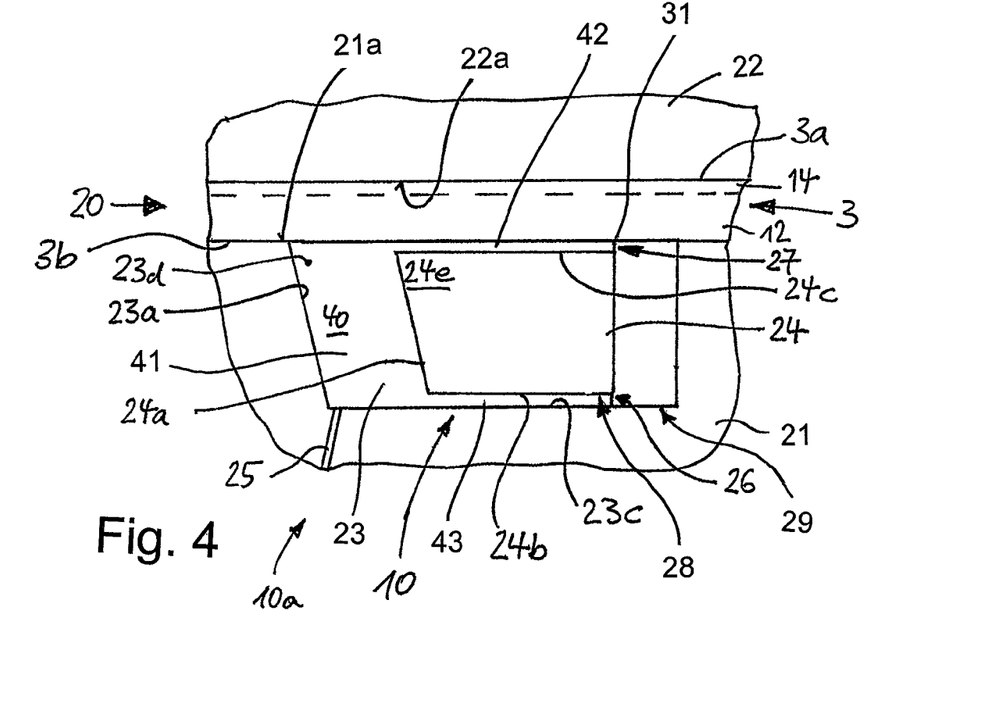
FIG. 4 is a schematic representation, depicting an arrangement of a compression tool with a polypropylene mat in a situation of a first step of the inventive production method. According to this arrangement, the compression tool comprises a bottom member, a top member and a cavity, disposed in the bottom member, with a slider for producing the attachment.
Figure 5:
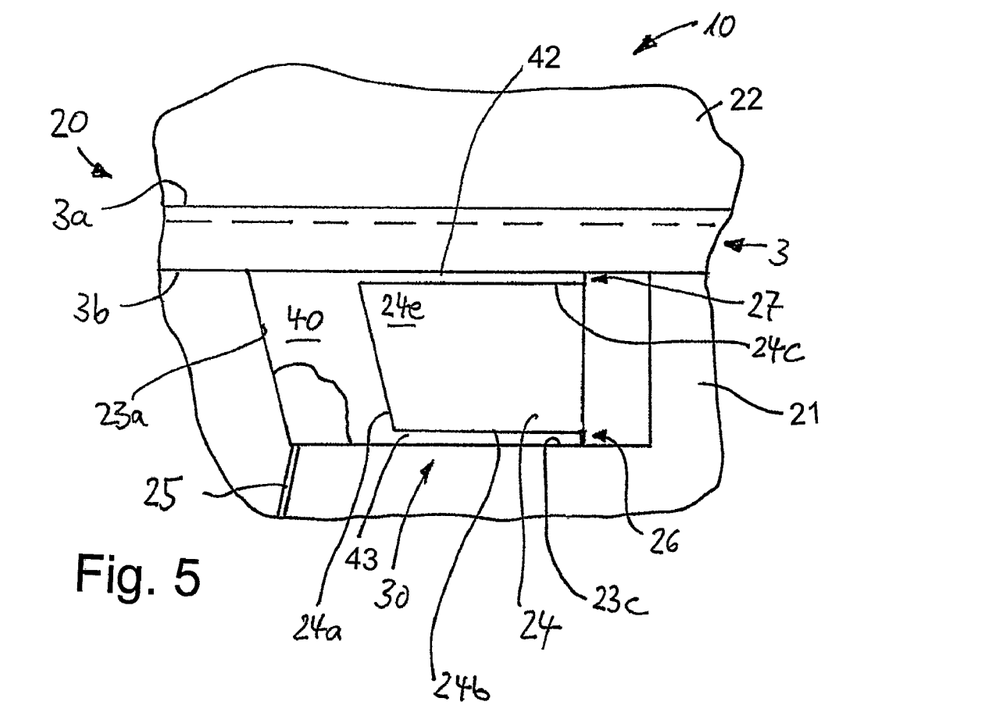
FIG. 5 depicts the arrangement, according to FIG. 4, in a situation of a second step of the inventive production method, in which plastic has been admitted into the cavity.
Figure 6:
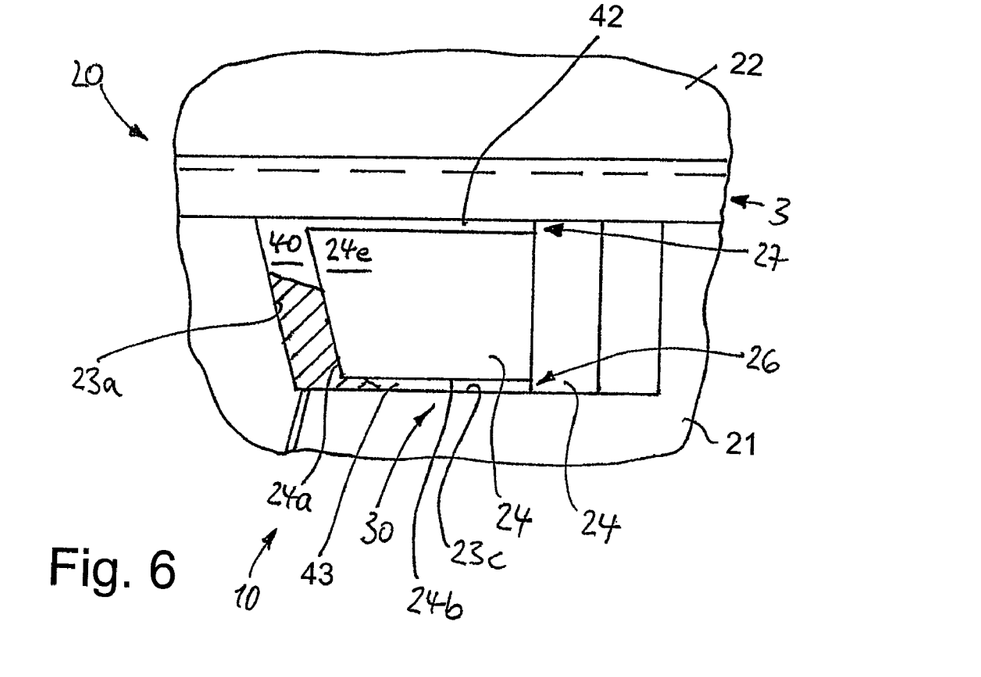
FIG. 6 depicts the arrangement, according to FIG. 4, in a situation of an additional step, in which the slider has been slid a little further in the intended direction of movement.

In order to produce the additional molded part 1 as a part of the component 3 to be produced, the lower tool half 21 comprising the engagement surface 21a, which is provided for engagement with the material for the backing layer 12, comprises a low pressure injection unit 10 for producing at least the additional molded part, such as an attachment, by a low pressure injection process with a casting mold 10a (FIG. 4). To this end the low pressure injection unit 10 comprises a slider 24, which can be operated by an actuator (not shown), and a feed channel 25 for feeding a plastic material in the liquid form preferably by means of an extruder screw S.

Figure 7:
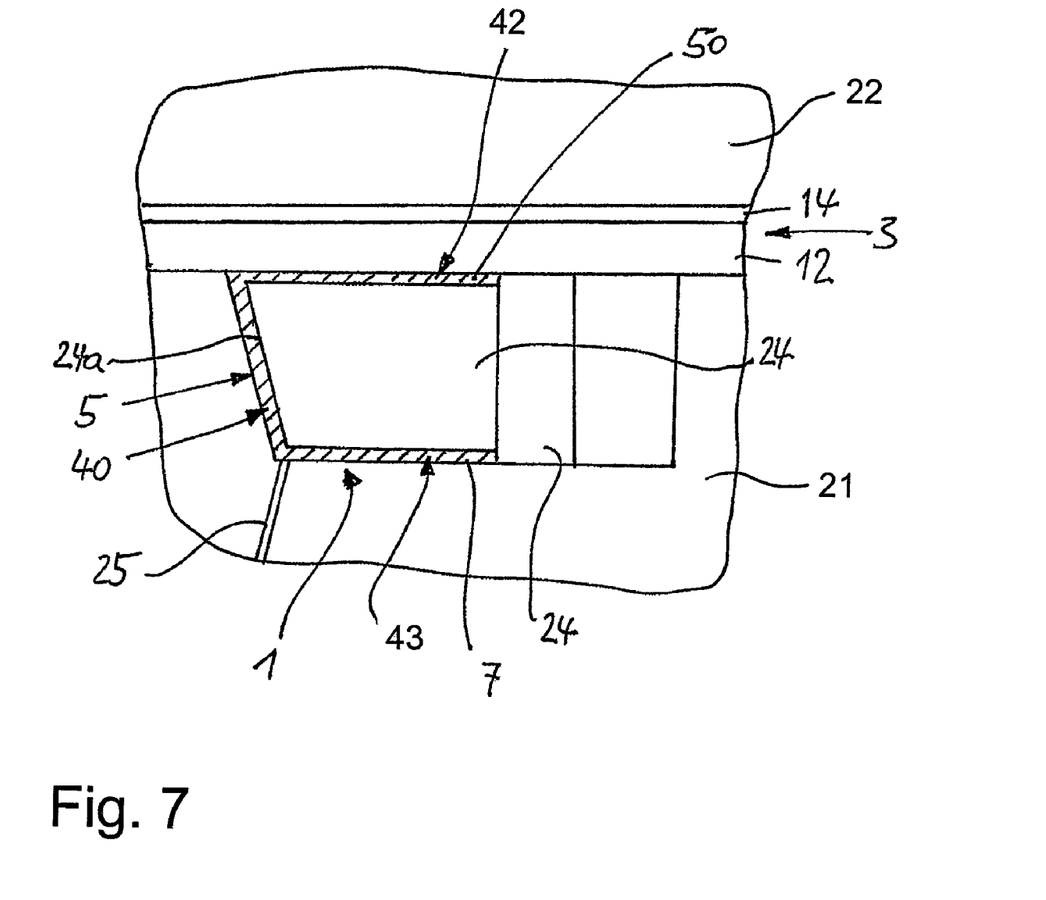
FIG. 7 depicts the arrangement, according to FIG. 4, in a situation of an additional step of the inventive production method, in which the slider has been slid into its end position.

FIG. 4 shows the low pressure injection unit 10 for producing a component 3 with an additional molded part, in this case, a retainer element 1, in an initial state. The materials for forming the component 3 are introduced into the tool 20 comprising the tool top member 22 and a tool bottom member 21. In the configuration according to FIG. 4, the component in its initial state, in the form of a plasticized mat, is disposed between the top member 22 and the bottom member 21. Moreover, the tool bottom member has a cavity 23 as well as the slider 24, which can be moved in the cavity. The tool bottom member 21 has the plastic feed channel 25 in order to feed plastic into the cavity 23 at a predefined time. During the production process the slider 24 can be moved by an adjusting device from an initial position (FIG. 4) into an end position (FIG. 7).

In general, both the tool top member 22 and the tool bottom member 21 may have one device or a plurality of devices for producing the attachments 1. Hence, each device comprises a cavity 23, a feed channel 25 or a nozzle as well as a moveable slider 24. The feed channel 25 interacts with a heat manifold and serves to maintain the plastic material, which is to be fed by a feeding device such as a screw or an extruder, in a nominal temperature range, which assures the introduction of material into the cavity 23 in the plastic state. Preferably the feed channel 25 has a valve, typically with a needle shut off for controlled discharge of material.

The cavity 23 together with the slider 24 form the mold for forming the attachment or retainer element 1. The cavity 23 makes a space available for receiving a slider 24, which can be slid longitudinally within predefined limits into the cavity 23. The cavity 23 is defined on a first side, facing the slider 24, by a first wall area 23a, which extends from the surface 3b of the backing layer 12 and lies opposite a corresponding front surface 24a of the slider of the slider 24. Furthermore, the cavity 23 has a lower wall area or bottom side 23c, which lies opposite the first side 3b of the layer 12, as well as side walls 23d, 23e (FIG. 2), which connect that region of the cavity 23, which rests against the inside 3b, with the bottom side 23c of the cavity. The bottom side 23c as well as the side walls 23d, 23e preferably are formed so as to be planar, but can also be curved in the contour-shaping part or can exhibit edges and steps. Furthermore, the side walls 23d, 23e preferably extend parallel to each other, but they can also together form an angle. The same applies to the bottom side 23c with respect to the inside 3b, both of which can extend, in particular, parallel to each other. In another embodiment, the slider 24 may comprise a curved slider area 24a, but which must be without undercuts.

The slider 24 exhibits not only a first surface 24a opposite the wall area 23a of the cavity 23, but also a lower slider area 24b, opposite the bottom side 23c of the cavity, and an upper slider area 24c, facing the inside 3b of the layer 12, as well as lateral slider areas facing the side walls 23d, 23e (only the slider area 24e lying opposite the side wall 23e, facing this slider area is shown in the figures). The slider areas 24a, 24b, 24c and/or 24e are preferably formed so as to be planar. However, the shape-forming part may also be, in general, curved or may exhibit edges or steps. The slider areas 24a, 24b, 24c and/or 24e are configured in such a manner that they form a displacement region in relation to the wall areas of the cavity. Therefore, due to the interaction of the displacement region and the wall areas, the thermoformable plastic, located inside the gap 40, can be displaced inside the changing intervening space 40 upon movement of the slider 24.

The bottom side 23c as well as the side walls 23d, 23e of the cavity 23 can run in a variety of ways, and particularly in parallel, in relation to the respective slider areas 24a, 24b, 24c and/or 24e. Preferably they extend at a negligible angle to each other, so that the respective areas form mold tapers. In the illustrated embodiment of the device 10, they extend parallel to each other. In the end position of the slider 24 (FIG. 7) the bottom side 23c as well as the side walls 23d, 23e of the cavity 23 define together with the slider areas 24a, 24b, 24c and/or 24e an intervening space 40, which forms the mold for the attachment 1 which is to be produced. In order to determine the end position of the slider 24, corresponding stops may be provided in the tool.

In one preferred embodiment, the slider 24 comprises a step 26 or 27 on the lower slider area 24b and on the upper slider area 24c, respectively. In the end position, according to FIG. 7, the step 27 in interaction with the side 3b of the layer 12 that faces said step, and the step 26 in interaction with the bottom side 23c of the cavity 23 form the end points of the intervening space 40. The intervening space 40 is formed by the gap 41 between the wall area 23a and the front slider area 24a, the gap 42 between the inside 3b and the upper slider area 24c as well as the gap 43 between the cavity bottom side 23c and the lower slider area 24b. When viewed from the intervening space beyond the step 26, 27, the slider 24 rests against the surface 3b of the layer 12 and/or the cavity bottom side 23c. Therefore, the slider 24 exhibits a cross section-tapering region 28 and a displacement region 29. The displacement region 29 is a point or a region, which extends in the displacement direction of the slider and which—while moving into the end position—pushes the plastic located in the intervening space 40 ahead of itself into the retainer cavity. To this end, the displacement region 29 generally has at least one point 31 at which the slider 24 rests against the side 3b of the component layer 12 that faces said slider and/or rests against the bottom side 23c of the cavity and/or against the cavity side walls 23d, 23e.

The limits of the intervening space 40 form the mold for the attachment 1 which is to be produced with the component 3. Due to the interaction of the displacement region and the wall areas, the fluid plastic located inside the intervening space 40 is displaced inside the changing intervening space 40 upon movement of the slider 24, so that as the slider 24 moves into its end position at which the volume of the intervening space 40 is the smallest, the thermoformable plastic is pressed into the mold, which corresponds to the configuration of the attachment to be produced.

The process of the invention for producing the component with the attachment is described below.

In a preparatory step prior to insertion into the tool 20, the mat for forming the backing layer 12 can be heated to a temperature between 150 and 200 degrees Celsius. The backing layer 12 is laid—optionally with at least one additional layer or a decorative layer 14—into the tool 20. In a first production step or in its initial state, the front slider area 24a of the slider 24 is at a predetermined distance from the first wall area of the mold 20 and/or the cavity 23, where the intervening space 40 is larger than in the end position of the slider 24. In the initial position of the slider 24, the intervening space 40 is preferably so large that the material that is to be fed into the intervening space has room in the gap 41, which is located between the front slider area 24a and the wall area 23a which faces said slider area, in the end position of the slider 24. At the same time it is provided that the volume of the gap is larger than 50% of the volume of the additional molded part which is to be produced.

Figure 8:
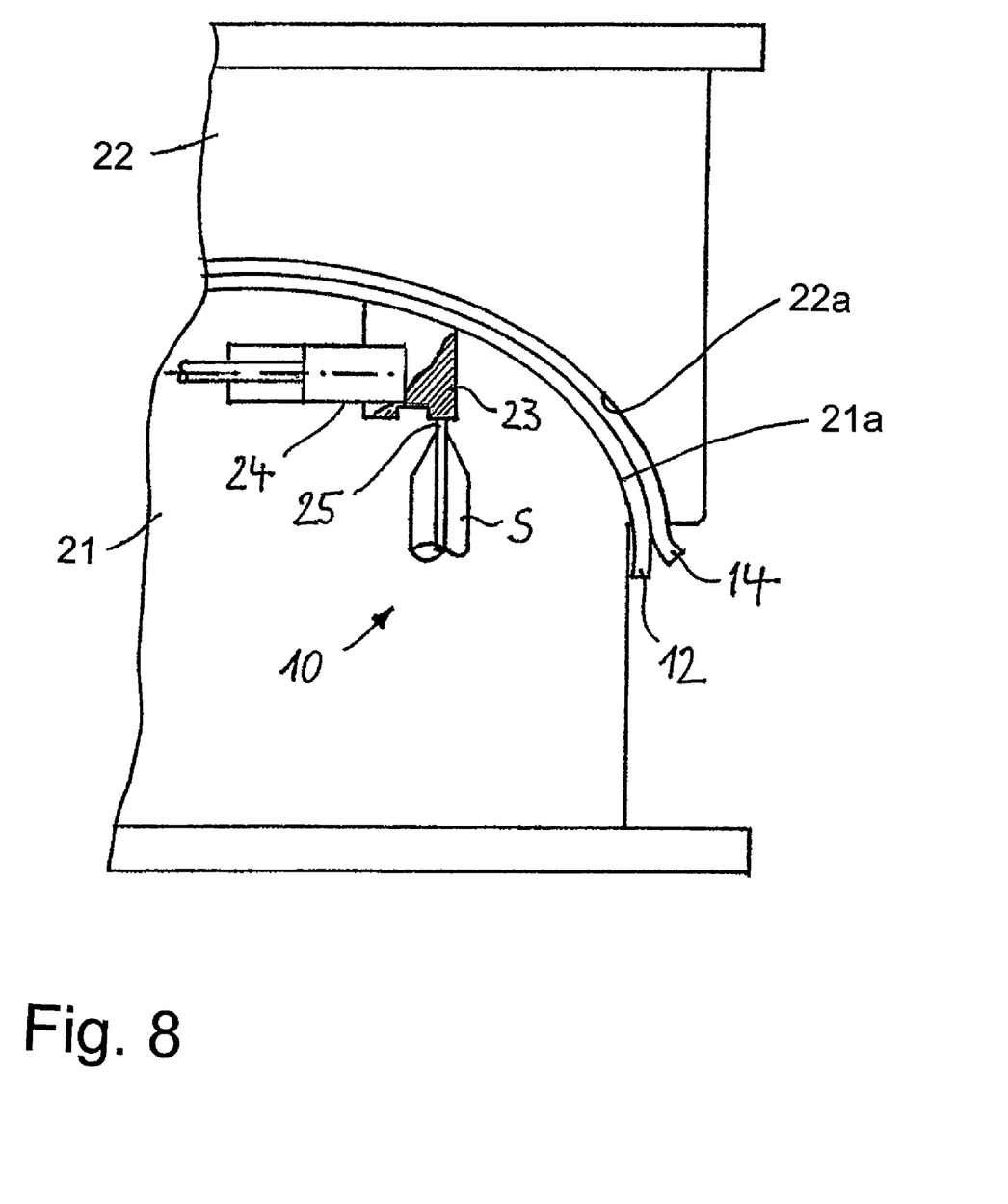
FIG. 8 is a schematic representation of an embodiment of a compression tool with the slider device for producing an additional molded part in a process step, in which the slider is in the retracted or initial position and the material has been fed into the cavity.

The compression molding tool 20 is closed, i.e., the tool members 21, 22 are moved toward each other. At the same time the material, comprising mats, is maintained at a temperature, preferably in a range between 150 degrees Celsius and 200 degrees Celsius. FIG. 8 shows the compression molding tool 20 in the closed position. Depending on the application, the plastic is admitted either totally or partially into the cavity 23.

In a next step, a predefined amount of the plasticized plastic—for example, polypropylene—is admitted through the channel 25 into the cavity 23 at a low pressure. The pressure exhibited by the plastic entering the cavity 23 is below 10 bar. The pressure, which is exerted on the plastic by the extruder screw (thus, in particular, the nozzle pressure of the extruder screw), must be provided so as to match. The volume or amount of the plastic to be introduced is less than the volume of the cavity 23. In most applications, the volume amount of the plastic is 70%, and in special applications it is at most 50%, of the volume of the cavity 23. In the discharge region of the extruder screw or in the feed channel 25, the pressure can range from 10 to 50 bar, i.e., the nozzle pressure of the extruder screw ranges preferably from 10 to 50 bar. The exact value is a function of the respective application and the composition of the plastic that is introduced.

Figure 9:
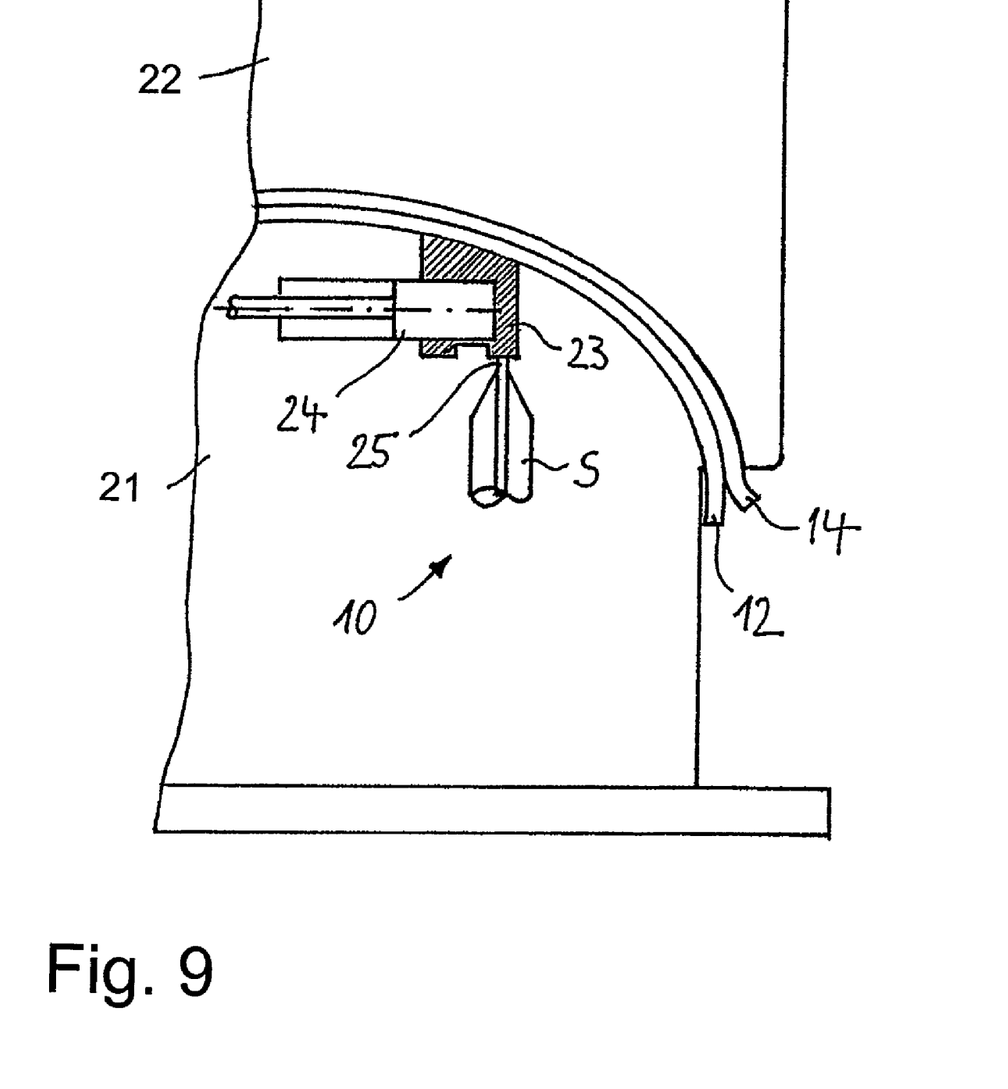
FIG. 9 is a schematic representation of an embodiment of a compression tool with the slider device, according to FIG. 8. In this case the slider has been slid into its end position; and all of the material that is to be used for producing the additional molded part has been fed into the cavity.

FIG. 9 depicts the compression molding tool 20 in the closed position. In this case the plastic has been introduced into the cavity 23, and the slider 24 has been moved into the end position.

The introduction of the plasticized plastic, e.g., polypropylene, into the cavity 23 does not cause any pressure load on the backing layer 12 or mat or on the optional additional layer 14. The plastic, e.g., the polypropylene, may alternatively be introduced before or during the movement of the slider 24 from its initial position into its end position, but not after the slider 24 has been moved from its initial position into its end position. Upon admission, the plastic, e.g., the polypropylene, has a temperature in the range between 170 and 220 degrees Celsius, and preferably has a temperature of 200 degrees Celsius +/−5 degrees Celsius. Thus the plastic, e.g. the polypropylene, is introduced at a relatively low pressure into the open cavity or intervening space 40 of the casting mold in order to form the additional molded part. Hence, the plastic, e.g. the polypropylene, is pushed by the movement of the slider 24 into all of the corners of the intervening space 40, which is formed by the cavity 23 and the slider 24 in its end position, and fills the intervening space. In this way the slider 24 assumes the function of a ram and, thus, acts as a pressure-building element. As a result of the use of a slider 24, the plastic or rather the polypropylene is uniformly distributed; and the attachment or retainer element is produced.

While the slider 24 is moved into its end position, the component 3 or rather the mat is still in a plastic state, i.e., it has a temperature of at least 130 degrees Celsius.

The end position of the slider 24 (FIG. 7) is a position in the cavity 23 at which the intervening space 40 which exists between them, corresponds to the negative mold of the attached component 1 which is to be produced.

In a preferred embodiment of the method and/or the production device 20, there is a spacing or a gap 42 between the upper slider surface 24c and the surface 3b of the backing layer 12 that faces the slider surface. By providing a space 42 ready for use, the spacing achieves or creates a reinforcing element or base 50 (FIG. 2) in the region of the connecting point of the attachment to the component 3 and/or the layer 12. The upper surface 24c of the slider 24 may also be constructed in such a manner that the gap 42 extends only in certain places on the slider from the front surface 24a of the slider and/or from one or both of the lateral surfaces of the slider.

In general, such a reinforcing element or such a base or elevation 50 can extend from any attachment element on the bottom side of the backing layer 12 that in the end state is connected to the same or extends from the same. Thus, the reinforcing element 50 is present in the transition region between the attachment and the rest of the component 3. Thus, the attachment or the component receives a higher flexural rigidity and a lower load stress per unit of area in the connecting region.

In the illustrated embodiment the intervening space 40 when the slider 24 is in its end position, is designed in such a manner that the component 3 is produced with the attachment 1, according to FIGS. 1 and 2.

In a preferred embodiment of the component 3 comprising a backing layer 12 and an additional layer 14, the additional layer 14 is laminated onto the layer 12 in the same production step in which the attachment 1 is formed.

After the molding of the component 3 with the attachment 1 is completed, the manufactured product is cooled down. This takes place preferably at a temperature between 20 and 60 degrees Celsius. According to experience, the entire component 3 cools down after about 40 seconds. After cooling down, the slider 24 is preferably retracted, and the tool 20 is opened in order to remove the component 3.

The invention claimed is:

1. A method for producing a component comprising a backing layer, a decorative layer, and an additional molded part which is made of plastic and extends from said backing layer, said method comprising:

placing a plasticized mat comprising fiber fractions as a starting material for the backing layer and a blank as a starting material for the decorative layer into a compression molding tool, said compression molding tool comprising a first tool half with a contour-shaping engagement surface for engagement with the starting material for the backing layer and a second tool half with a contour-shaping engagement surface disposed opposite the contour-shaping engagement surface of the first tool half, for engagement with the starting material for the decorative layer, said first tool half comprising at least one cavity having a contour corresponding to an exterior configuration of said additional molded part, a slider having a contour configured to form at least a concave inner configuration of said additional molded part and which can be slid into said cavity by an adjustment device, and a feed channel connected to source of plastic material and leading to said cavity, wherein said slider is in an initial retracted position;

compressing the tool halves in order to connect the starting materials for the backing layer and the decorative layer to each other and simultaneously or subsequently introducing a predetermined amount of plastic in a plastic state through the feed channel into the cavity, wherein the volume of the plastic which is introduced into the cavity is less than the volume of the cavity;

moving the slider into an extended end position to displace the plastic in the cavity so that the plastic fills an intervening space formed between the cavity and the slider in said end position and forms said additional molded part integrally with said backing layer;

allowing the plastic in the cavity to cool, and thereafter returning the slider to the initial retracted position and separating the tool halves, so that the produced component can be removed from the compression molding tool.

2. A method as claimed in claim 1, wherein the plastic is introduced into the cavity at a pressure of less than 10 bar.

3. A method, as claimed in claim 1, wherein the volume of the plastic introduced into the cavity is not more than 70% of the volume of the cavity.

4. A method, as claimed in claim 1, wherein the plastic is introduced at a temperature of 200° C.+/−30° C.

5. A method, as claimed in claim 1, wherein while the slider is moved into the end position, the component material has a temperature in the range between 100° C. and 170° C.

6. A method as claimed in claim 1, wherein the introduced plastic is polypropylene.

7. A method as claimed in claim 1, wherein the backing layer starting material is comprised of at least one type of fibers selected from the group consisting of polypropylene, flax, kenaf, sisal, linen, cotton and glass fibers.

8. A method as claimed in claim 1, wherein an additional layer for forming a decorative layer is applied to the backing layer before the plastic is introduced.

9. A method as claimed in claim 1, wherein the additional molded part comprises at least one attachment or a structural element that projects from the backing layer or a rod-shaped structure.

10. A method as claimed in claim 1, wherein the additional molded part is a holder for receiving components or other parts.

11. A method as claimed in claim 1, wherein the additional molded part is a connecting element or a rib or a spacing element or a structural element for improving the strength of the component.

12. An apparatus for producing a component comprising a decorative layer, a backing layer and at least one additional molded part extending from said backing layer, said apparatus comprising a compression molding tool comprising a first tool half with a contour-shaping engagement surface for engagement with a starting material for the backing layer and a second tool half with a contour-shaping engagement surface disposed opposite the contour-shaping engagement surface of the first tool half, for engagement with a starting material for the decorative layer, the compression molding tool further comprising at least one device for producing the additional molded part, wherein the device for producing the additional molded part is an injection molding device which comprises a cavity and a slider which can be slid into the cavity between an initial retracted position and an extended end position by an adjustment device, such that the additional molded part having a concave inner configuration can be formed in an intervening space between a front surface of the slider in the direction of slider movement and a wall of the cavity wall which faces said front surface of the slider in the end position of the slider, whereby upon movement of the slider surfaces of the slider are displaced relative to respective facing surfaces of the cavity and form a changing intervening space in which a plastic material introduced into the cavity is formed into the additional molded part.

13. An apparatus as claimed in claim 12, wherein the slider is constructed in such a manner that there is a space between a bottom surface of the slider which faces the backing layer of the component, whereby a connecting element can be formed in a transition area between the component and the additional molded part.

14. An apparatus as claimed in claim 12, wherein the cavity and the slider are configured such that the additional molded part comprises least one structural element which projects from the component or a rod-shaped structure.

15. An apparatus as claimed in claim 12, wherein the cavity and the slider are configured such that the additional molded part comprises a holder for receiving components or other parts.

16. An apparatus as claimed in claim 12, wherein the cavity and the slider are configured such that the additional molded part comprises a connecting element or a rib or a structural element for improving the strength of the component.

* * * * *